US009804743B2

(12) United States Patent
Ho et al.

(10) Patent No.: US 9,804,743 B2
(45) Date of Patent: *Oct. 31, 2017

(54) SEQUENTIAL SELECTION OF MULTIPLE OBJECTS

(71) Applicant: Zynga Inc., San Francisco, CA (US)

(72) Inventors: James Ho, Mill Valley, CA (US); Szymon Swistun, Belmont, CA (US); Nils Jonas Norberg, San Francisco, CA (US); Sulabh Patel, San Mateo, CA (US)

(73) Assignee: Zynga Inc., San Francisco, CA (US)

( * ) Notice: Subject to any disclaimer, the term of this patent is extended or adjusted under 35 U.S.C. 154(b) by 381 days.

This patent is subject to a terminal disclaimer.

(21) Appl. No.: 14/636,631

(22) Filed: Mar. 3, 2015

(65) Prior Publication Data

US 2015/0177931 A1    Jun. 25, 2015

Related U.S. Application Data

(63) Continuation of application No. 13/783,845, filed on Mar. 4, 2013, now Pat. No. 9,003,333.

(51) Int. Cl.
*G06F 3/048* (2013.01)
*G06F 3/0482* (2013.01)
(Continued)

(52) U.S. Cl.
CPC ............ *G06F 3/0482* (2013.01); *A63F 13/04* (2013.01); *A63F 13/2145* (2014.09);
(Continued)

(58) Field of Classification Search
CPC ..................................................... G06F 3/0482
(Continued)

(56) References Cited

U.S. PATENT DOCUMENTS 7,855,718 B2 * 12/2010 Westerman ........... G06F 3/0418
345/156
8,500,535 B2   8/2013 Brosnan et al.
(Continued)

OTHER PUBLICATIONS

"U.S. Appl. No. 13/783,845, Notice of Allowance dated Jan. 20, 2015", 14 pgs.
(Continued)

*Primary Examiner* — David Phantana Angkool
(74) *Attorney, Agent, or Firm* — Schwegman Lundberg & Woessner, P.A.

(57) ABSTRACT

A device may be configured to provide a user interface that supports sequential selection of objects displayed on a screen. As configured, the device may display a presentation of multiple objects, and the device may receive a user input that defines a path within the presentation of displayed objects. The device may then determine the sequential order of a selected subset of the displayed objects. Based on this sequential order, the device may select, initiate, and perform an action that is targeted at the selected subset of the objects. In the context of an action game, the user may trace the path through various enemies, and the device may select and perform the action based on the number of enemies, the type of enemies, or the order in which the enemies were selected. Selection and initiation of the action may begin while the user input is still being received.

20 Claims, 10 Drawing Sheets

(51) Int. Cl.

*A63F 13/219* (2014.01)
*G06F 3/0486* (2013.01)
*A63F 13/426* (2014.01)
*A63F 13/2145* (2014.01)
*G06F 3/0481* (2013.01)

(52) U.S. Cl.
CPC .......... *A63F 13/426* (2014.09); *G06F 3/0486* (2013.01); *G06F 3/04817* (2013.01)

(58) Field of Classification Search
USPC ........................................................ 715/845
See application file for complete search history.

(56) References Cited

U.S. PATENT DOCUMENTS

| | | | |
|---|---|---|---|
| 8,519,971 B1* | 8/2013 | Mackraz | G06F 3/147 313/504 |
| 8,904,165 B2 | 12/2014 | Reeves et al. | |
| 2002/0191029 A1* | 12/2002 | Gillespie | G06F 3/04817 715/810 |
| 2009/0184935 A1* | 7/2009 | Kim | G06F 3/0416 345/173 |
| 2011/0260999 A1* | 10/2011 | Wang | G06F 3/0488 345/173 |
| 2012/0032979 A1* | 2/2012 | Blow | G06F 1/1626 345/647 |
| 2012/0038571 A1* | 2/2012 | Susani | G06F 3/0416 345/173 |
| 2012/0324384 A1* | 12/2012 | Cohen | G06F 3/04886 715/765 |
| 2013/0046544 A1 | 2/2013 | Kay et al. | |
| 2013/0227490 A1 | 8/2013 | Thorsander et al. | |
| 2013/0263251 A1* | 10/2013 | Fleizach | G06F 3/04883 726/19 |
| 2014/0173483 A1 | 6/2014 | Hicks | |
| 2014/0248948 A1 | 9/2014 | Ho et al. | |
| 2017/0031542 A1* | 2/2017 | Ryu | G06F 3/04817 |
| 2017/0060408 A1* | 3/2017 | Wang | G06F 3/04883 |
| 2017/0090708 A1* | 3/2017 | Kim | G06F 3/04817 |

OTHER PUBLICATIONS

Zynga Support, "Getting Started in FarmVille 2", http://support.zynga.com/article/farmville-2/Getting-Started-in-FarmVille-2-en_US, > Home > FarmVille 2 > Game Guides > Getting Started in FarmVille 2 Tue Jan. 8, 2013 20:37:45 EST, (Jan. 8, 2013).

* cited by examiner

SEQUENTIAL SELECTION OF MULTIPLE OBJECTS

RELATED APPLICATION

This application is a continuation of U.S. patent application Ser. No. 13/783,845, filed on Mar. 4, 2013, which is incorporated by reference herein in its entirety.

TECHNICAL FIELD

The subject matter disclosed herein generally relates to the processing of data. Specifically, the present disclosure addresses systems and methods to facilitate sequential selection of multiple targets.

BACKGROUND

Modern devices may provide a user interface (e.g., a graphical user interface) in which a user can designate one or more displayed objects (e.g., icons, items, or targets) as being selected by the user. For example, a computer may be configured to provide a graphical user interface that allows one or more objects displayed on a screen to be selected using a mouse-operated cursor. In some configurations, a mouse click will select a single object. In certain configurations, a mouse click followed by a diagonal drag will draw a rectangular selection area (e.g., a "rubber band" selection window) that designates all displayed objects within its boundary as being selected when the diagonal drag is completed. As another example, a touchscreen device (e.g., a smartphone or tablet computer) may be configured to provide a graphical user interface that allows one or more objects displayed on a touch-sensitive screen to be selected using a fingertip or stylus (e.g., a touch causing the selection of a single object).

BRIEF DESCRIPTION OF THE DRAWINGS

Some embodiments are illustrated by way of example and not limitation in the figures of the accompanying drawings.

DETAILED DESCRIPTION

Example methods and systems are directed to facilitate sequential selection of multiple objects (e.g., icons, items, or targets displayed on a screen). Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

A device (e.g., a portable or stationary computer or other machine) may be configured (e.g., by special-purpose software) to provide a user interface that supports sequential selection of multiple objects (e.g., icons, items, targets, or other displayable objects) that are displayed on a screen (e.g., a touchscreen of the device or a video monitor connected to the device). As configured, the device may display a presentation of multiple objects, and the device may receive a user input (e.g., mouse input, cursor input, touch input, gesture input, or any suitable combination thereof) that defines a path within (e.g., through) the presentation of displayed objects. For example, within a presentation of eight displayed objects, the user of the device may trace a path that starts on a first object, passes through three other objects (e.g., second, third, and fourth objects), and ends on a fifth object. The device may then determine the sequential order of a selected subset of the displayed objects (e.g., the first, second, third, fourth, and fifth object among the eight displayed objects). Based on the sequential order, the device may select, initiate, and perform an action that is targeted at the selected subset of the displayed objects.

In the context of a device configured to play an action game in which a player character (e.g., represented by an avatar on the screen of the device) battles multiple enemies, the user may trace the path through a group of icons that represent various enemies in the game. In some example embodiments, the path connects the selected subset of the enemies, and the device may select and perform the action based on the number of enemies selected, the type of enemies selected, the order in which the enemies were selected (e.g., selecting a "boss" enemy at the beginning of the path or at the end of the path), or any suitable combination thereof. According to certain example embodiments, selection, initiation, or performance of the action may begin while the user input is still being received (e.g., the player character may begin applying a particular attack on selected enemies while the user is still completing his selection of the enemies to be attacked by the player character).

Figure 1:
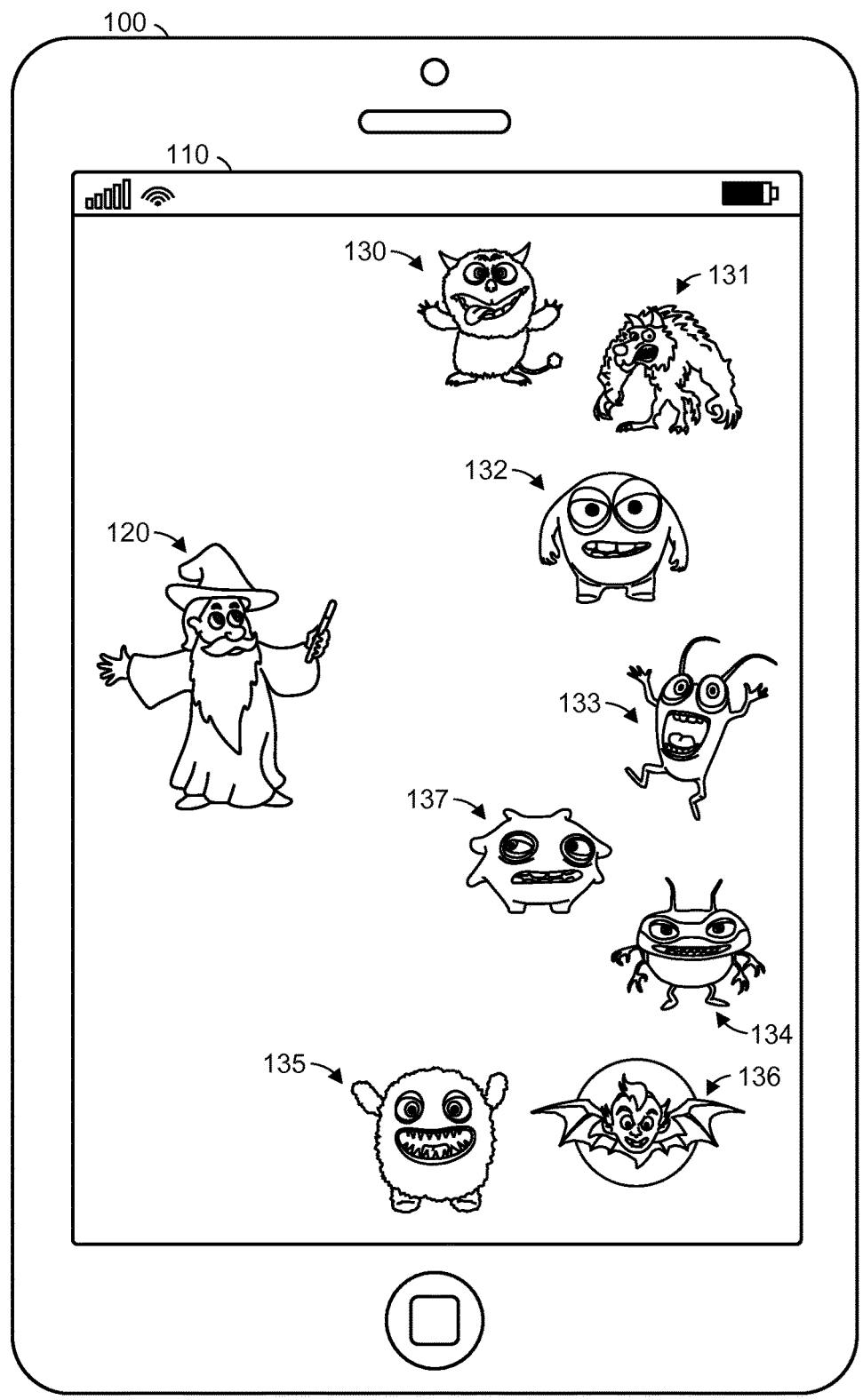
FIG. 1-4 are screenshots illustrating sequential selection of multiple objects from the perspective of a user of a device, according to some example embodiments.

FIG. 1-4 are screenshots illustrating sequential selection of multiple objects from the perspective of a user of a device, according to some example embodiments. FIG. 1, a device 100 (e.g., a smart phone executing a software application, applet, or "app") has a screen 110, which may be a touch-sensitive screen (e.g., touchscreen). The device 100 is configured (e.g., by one or more software modules) to display a user interface on the screen 110.

As shown in FIG. 1, a player character 120 is displayed on the screen 110. The player character 120 may be an avatar or other icon that represents the character within a game that is being played by a user of the device 100. In FIG. 1, the player character 120 has the appearance of a wizard.

Also shown in FIG. 1 are enemies 130-137, which are also displayed on the screen 110 as icons that represent individual enemies (e.g., adversaries or opponents) of the player character 120 within the game. In FIG. 1, the enemies 130-137 have the appearance of various monsters. Collectively, the enemies 130-137 may be referred to as a presentation of objects (e.g., presentation of enemies or icons that represent enemies) that are available for selection (e.g., available for choosing or targeting).

Figure 2:
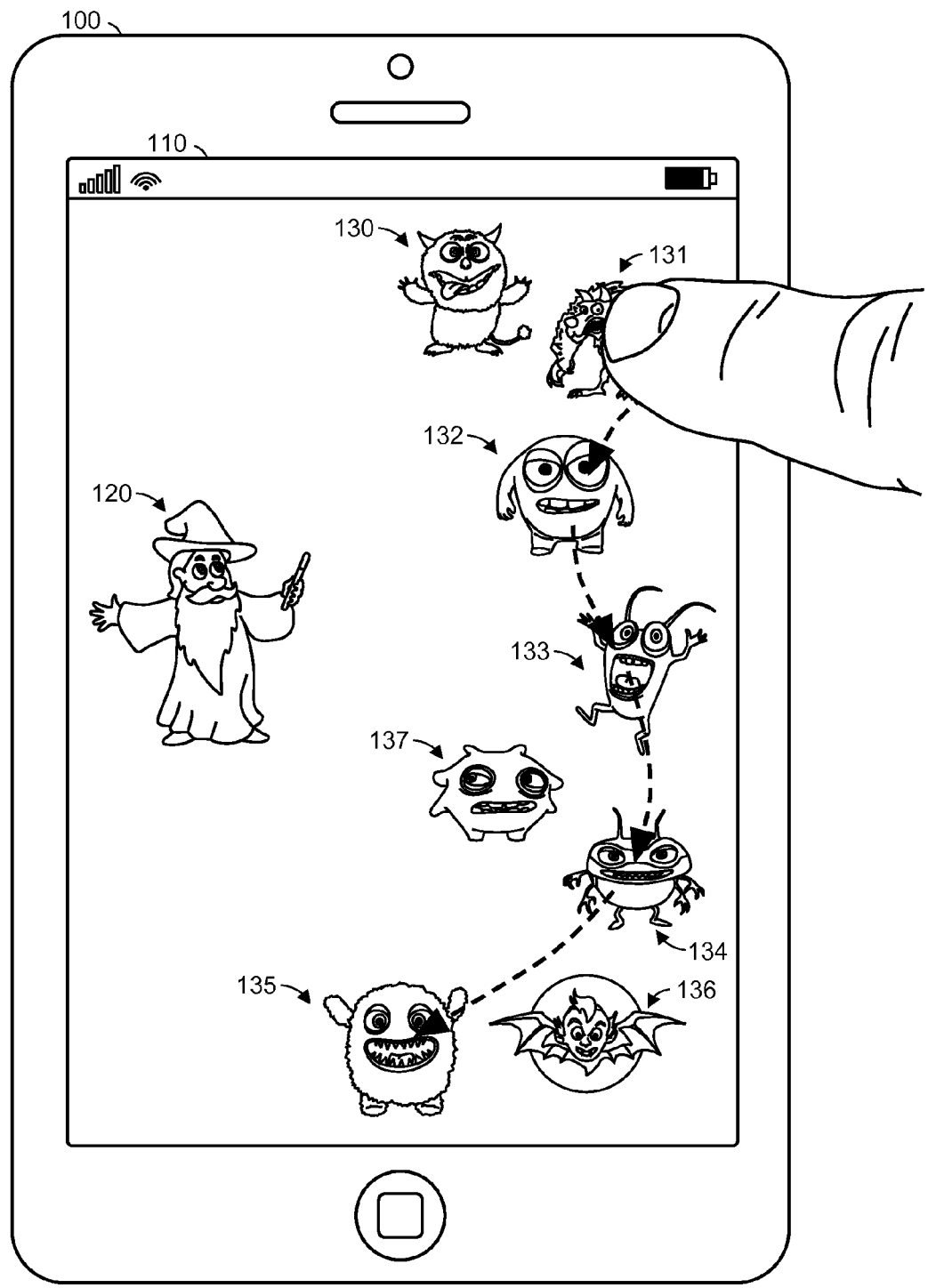

In FIG. 2, the user of the device 100 is using a finger to define (e.g., trace) a path through the enemies 130-137. The path is represented by a broken line with arrowheads indicating the direction in which the path is being defined (e.g., traced) by the user's finger. Accordingly, the path has a beginning and an end. In the example shown in FIG. 2, the path begins on enemy 131, travels through enemies 132, 133, and 134, and ends on enemy 135. At the time illustrated in FIG. 2, the finger of the user is touching the enemy 131 and is beginning to trace the path. According to some example embodiments, the enemy 131 is the first object in a selected subset of objects (e.g., targets or enemies) displayed on the screen 110.

Figure 3:
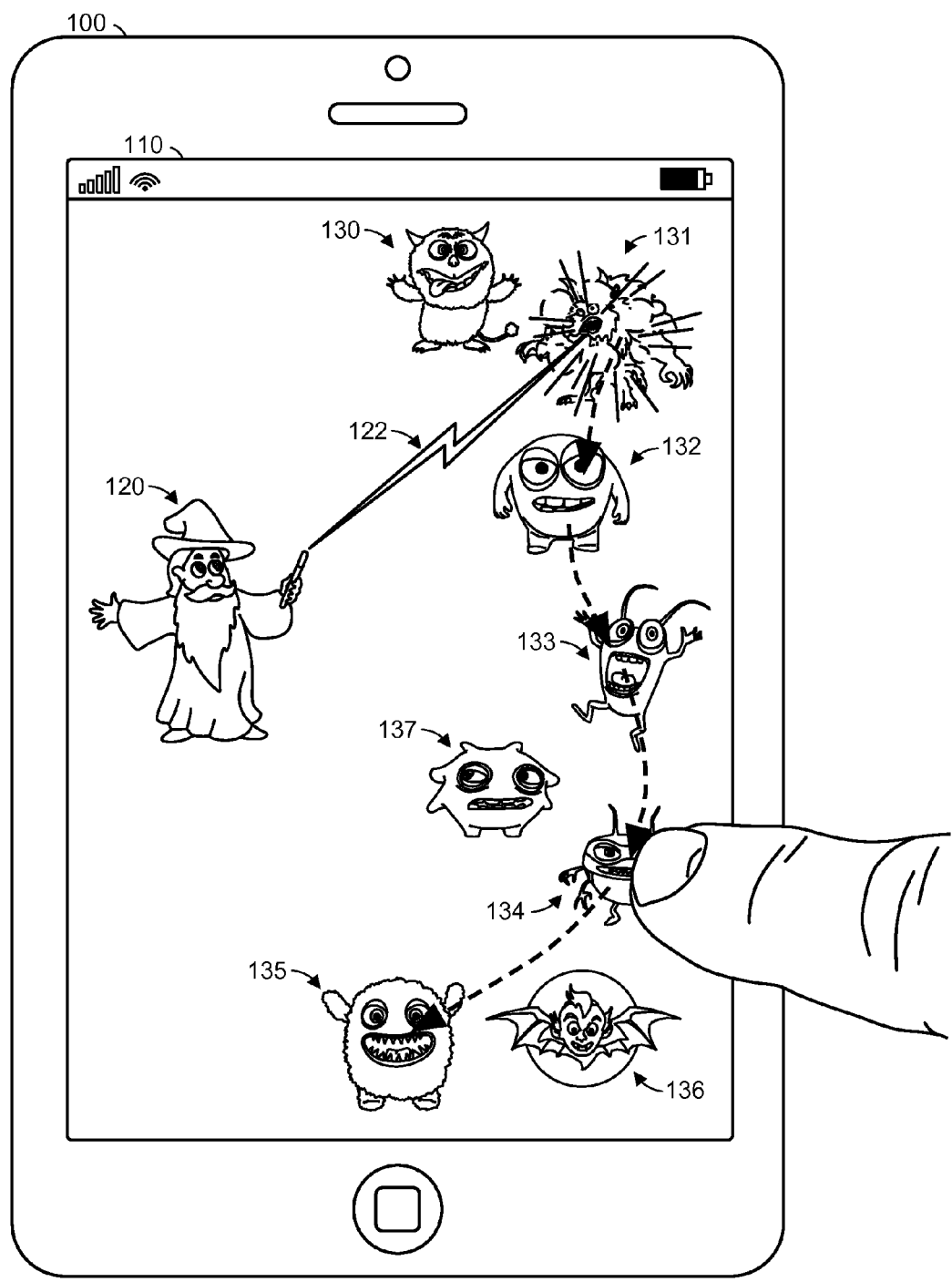

In FIG. 3, the user of the device 100 is continuing to use his finger to define the path through the enemies 130-137. As noted above, the path is represented by the broken line with arrowheads that indicate the direction in which the path is being defined. At the time illustrated in FIG. 3, the enemies 131, 132, and 133 have been previously added to the path, in sequential order, and by virtue of being connected by the path are now designated as being selected by the user. In addition, at the time illustrated in FIG. 3, the finger of the user is touching the enemy 134, which has the effect of connecting the enemy 134 to the path as the next object selected for inclusion in the selected subset of objects displayed on the screen 110. According to certain example embodiments, although the user is continuing to define the path, the device 100 (e.g., as configured by one or more software modules) has determined (e.g., selected) an action 122 that is targeted at the previously selected enemies 131-133 (e.g., an action that targets the previously selected enemies 131-133). At the time illustrated in FIG. 3, this selected action 122 (e.g., an attack with a lightning bolt) has been initiated and performed by the device 100 against the enemy 131. In the example shown in FIG. 3, the action 122 includes the enemy 131 being attacked by the player character 120 (e.g., with a lightning bolt).

Figure 4:
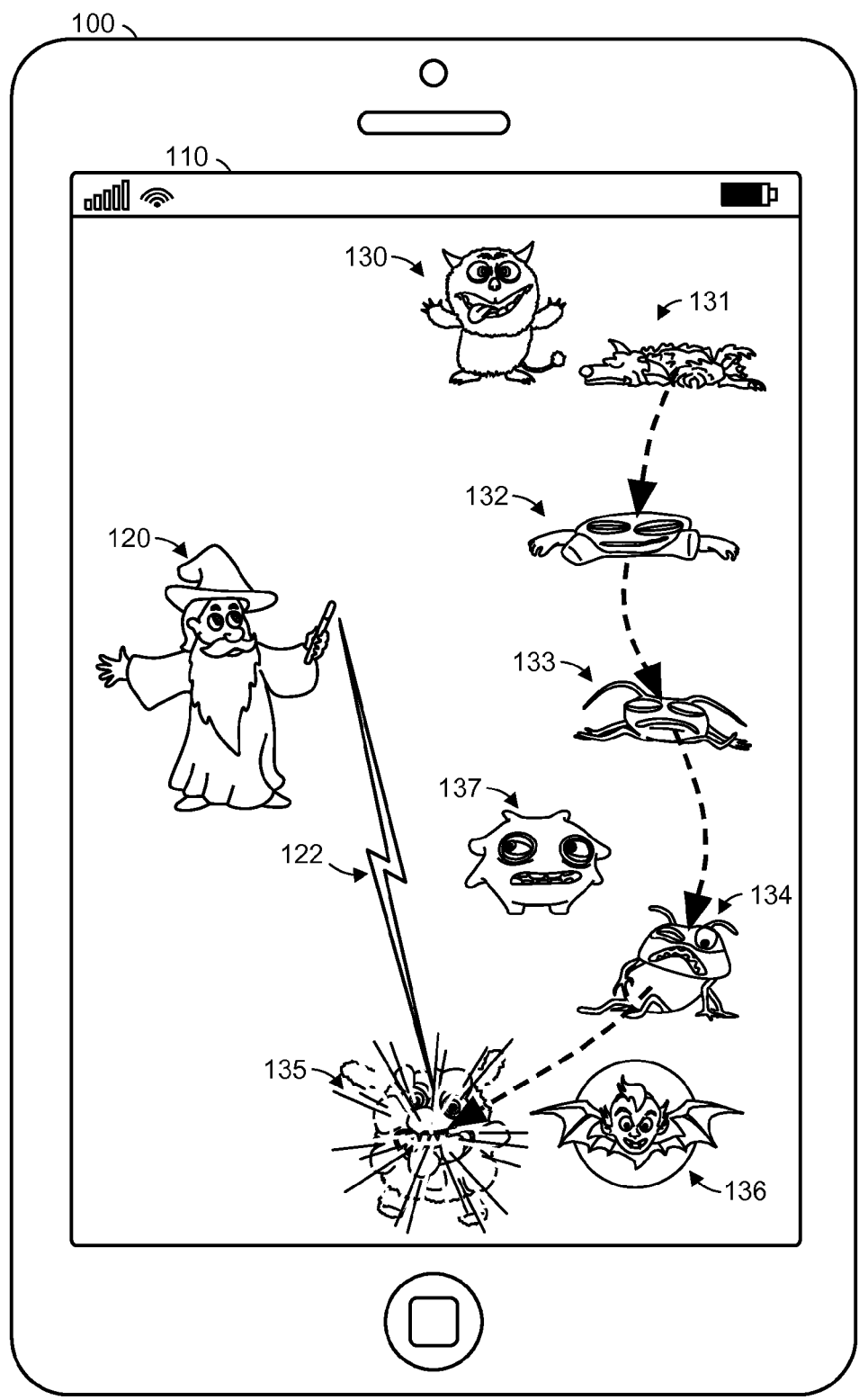
Figure 5:
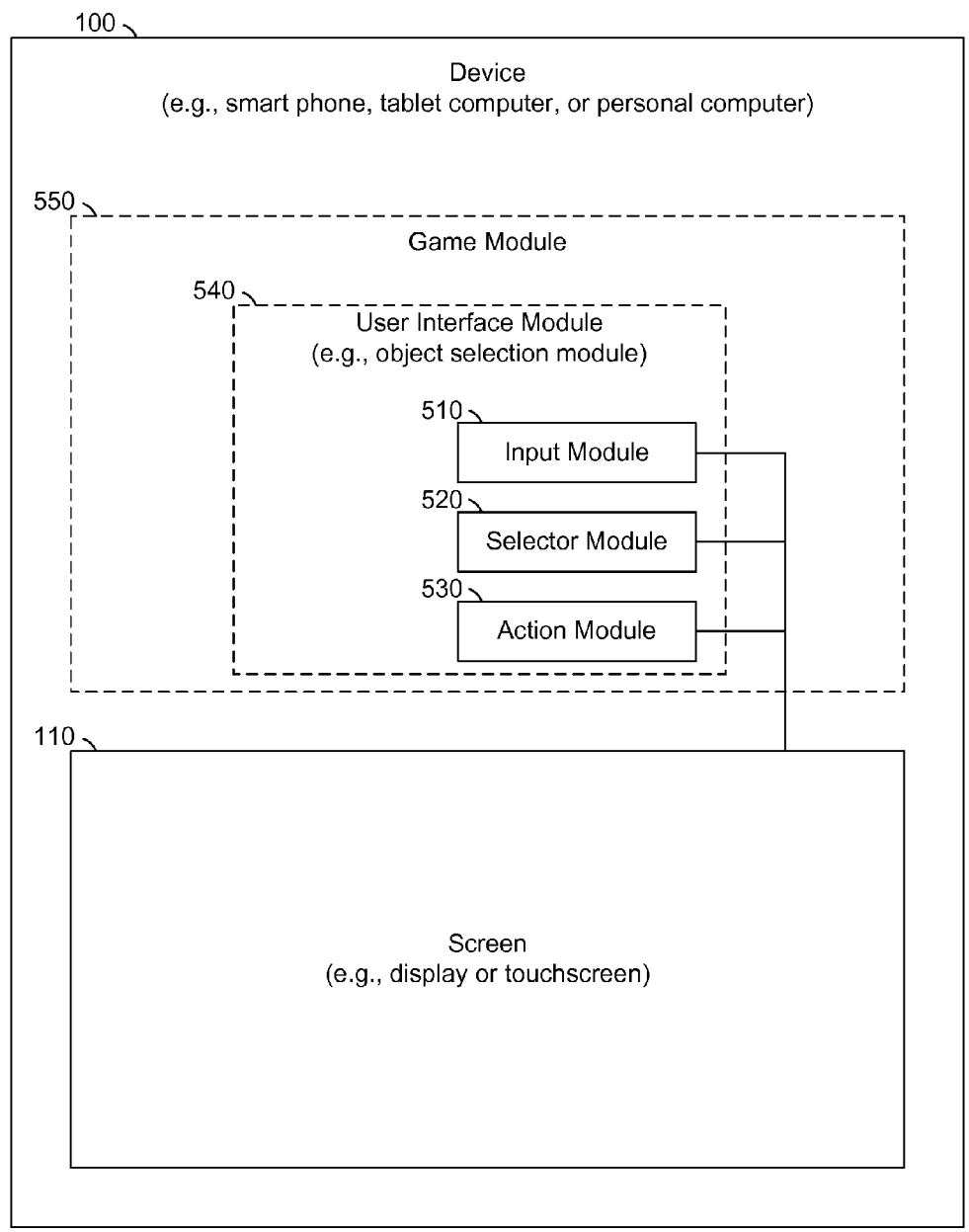
FIG. 5 is a block diagram illustrating components of a device configured for sequential selection of multiple objects, according to some example embodiments.

In FIG. 4, the user of the device 100 has completed his definition of the path through the enemies 130-137. As noted above, the path is represented by the broken line with arrowheads, and the path ends on the enemy 135. As illustrated in FIG. 5, the action 122 selected by the device 100 (e.g., a lightning attack) has been selected, initiated, and performed with respect to the subset of the enemies 130-137. In particular, since the enemies 131-135 are connected by the path, in the sequential order defined by path (e.g., from the beginning of the path to the end of the path), the enemies 131-135 constitute a selected subset of the enemies 130-137 targeted for the action 122. Since the action 122 may be selected, initiated, and performed on objects as soon as they are selected, FIG. 4 depicts the enemies 131, 132, and 133 as being dead as a result of the action 122 (e.g., killed by a lightning attack from the player character 120), while the enemy 134 is depicted as in the process of dying (e.g., from the same lightning attack) and the enemy 135 is depicted as currently being targeted by the action 122 (e.g., coming under the same lightning attack). At the time illustrated in FIG. 4, the user's finger has moved out of view, since the defining (e.g., tracing) of the path has ended.

In some example embodiments, the device 100 modifies the action based on the path. For example, if the enemy 135 has a particular characteristic (e.g., being a "boss" enemy or an enemy of a particular type), the action 122 targeted at the enemy 135 may be selected based on that particular characteristic (e.g., a more powerful lightning attack than that which was applied to the enemies 131-134). In certain example embodiments, the device 100 may select the action 122 based on the particular characteristic appearing at the end of the defined path. For example, if the user ends the path on a "boss" enemy, the selected action 122 may be a special attack (e.g., a powerful lightning attack), but if the user ends the path on a regular enemy, the selected action 122 may be a different attack (e.g., a weaker fireball attack). Different effects may be selected by the device 100 in situations where the user begins the path on a "boss" enemy, or where a "boss" enemy is between the beginning of the path and the end of the path (e.g., in the middle of the path).

FIG. 5 is a block diagram illustrating components of the device 100 configured for sequential selection of multiple objects, according to some example embodiments. The device 100 may be implemented in a computer system, in whole or in part, as described below with respect to FIG. 10. For example, the device 100 may be implemented in a general-purpose computer modified (e.g., configured or programmed) by software to be a special-purpose computer to perform one or more of the functions described herein for the device 100. For example, a computer system able to implement any one or more of the methodologies described herein is discussed below with respect to FIG. 10. Moreover, the functions described herein for the device 100 may be subdivided among multiple devices.

A user of the device 100 may be a human user (e.g., a human being), a machine user (e.g., a computer configured by a software program to interact with the device 100), or any suitable combination thereof (e.g., a human assisted by a machine or a machine supervised by a human). The user is not part of the device 100, but is associated with the device 100 and may be an owner of the device 100. For example, the device 100 may be a desktop computer, a vehicle computer, a tablet computer, a navigational device, a portable media device, or a smart phone belonging to the user.

The device 100 is shown as including the screen 110 (e.g., a display, touchscreen, or any suitable combination thereof), as well as an input module 510, the selector module 520, and an action module 530, all configured to communicate with each other (e.g., via a bus, shared memory, or a switch). In some example embodiments, the input module 510, the selector module 520, the action module 530, or any suitable combination thereof, may form all or part of the user interface module 540. In some example embodiments, the user interface module 540 is configured as an object selection module (e.g., object targeting module within a game application). In certain example embodiments, the user interface module 540 may be included within a game module 550 (e.g., a game application, applet, or mobile "app" executing on the device 100).

Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 6:
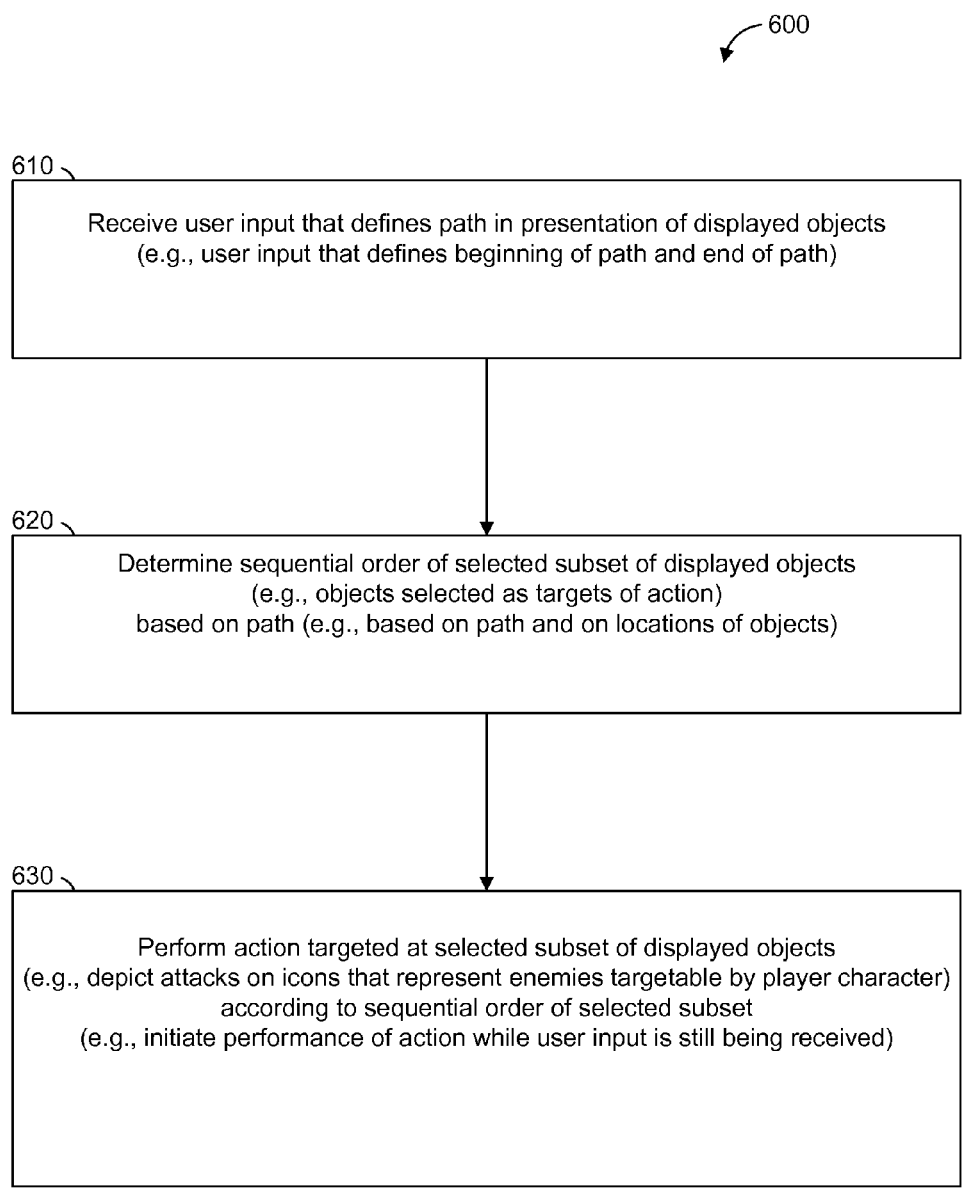
FIG. 6-9 are flowcharts illustrating operations of the device in performing a method of sequential selection of multiple objects, according to some example embodiments.

FIG. 6-9 are flowcharts illustrating operations of the device 100 in performing a method 600 of sequential selection of multiple objects (e.g., enemies 131, 132, 133, 134, and 135, in that order), according to some example embodiments. Operations in the method 600 may be performed by the device 100, using modules described above with respect to FIG. 5. As shown in FIG. 6, the method 600 includes operation 610, 620, and 630.

In operation 610, the input module 510 receives a user input that defines a path in a presentation of displayed objects (e.g., enemies 130-137) available for selection as targets of an action (e.g., action 122). The user input may be received in the form of mouse input, cursor input, touch input, stylus input, gesture input, voice input, eye tracking input, or any suitable combination thereof. The path may be defined within (e.g., through) the presentation of displayed objects, and the path may have a beginning and an end, as defined by the user input received. According to various example embodiments, the path may be straight-line path, curved path, broken path, or any suitable combination thereof.

In some example embodiments, the presentation of displayed objects displays the objects (e.g., enemies 130-137) in a three-dimensional arrangement. In such example embodiments, the user input received in operation 610 may define three-dimensional path that connects multiple objects in the three-dimensional arrangement, and the connected objects may later be determined to be the selected subset of the displayed objects.

In certain example embodiments, the presentation of displayed object displays the objects (e.g., enemies 130-137) in a two-dimensional arrangement. In such example embodiments, the user input received in operation 610 may define a two-dimensional path that connects two or more objects in the two-dimensional arrangement, and these connected objects they later determined to be the selected subset of the displayed objects.

In operation 620, the selector module 520 determines a sequential order of a selected subset of the displayed objects in the presentation (e.g., enemies 131, 132, 133, 134, and 135, in that order). The selector module 520 may accordingly determine that the objects in this selected subset are the targets of the action (e.g., action 122). This determination may be made based on the path defined by the user input received by the input module 510, based on the locations of one or more of the selected objects, or any suitable combination thereof. For example, the selector module 520 may determine that an object (e.g., enemy 133) is included or excluded from the selected subset based on the path intersecting the object on the screen 110, intersecting a boundary (e.g., an outline) of the object on the screen 110, or approaching within a threshold distance of the object on the screen 110 (e.g., within a threshold distance of the object's boundary). According to various example embodiments, the selector module 520 determines the sequential order based on when an object (e.g., enemy 133) is added to the selected subset. In some example embodiments, the selector module 520 displays an indication of the path on the screen 110, and the indication of the path may visually appear to connect the selected objects as they are added to the selected subset.

In operation 630, the action module 530 performs an action (e.g., action 122) that is targeted at the selected subset of the displayed objects (e.g., enemies 131-135). According to some example embodiments, the action may be performed according to the sequential order determined by the selector module 520 (e.g., enemies 131, 132, 133, 134, and 135, in that order). In some example embodiments, performance of the action may be initiated by the action module 530 while the user input is still being received (e.g., continues to be received) by the input module 510. As noted above, in the example context of a game (e.g., game module 550) executing on the device 100, the performed action may be or include the action 122, which may be depicted as sequential attacks on the enemies 131-135, which as noted above may be targetable by the player character 120. For example, the performing of the action in operation 630 may include applying an effect (e.g., a graphical effect, such as an animated explosion or a freezing of motion) of the action to each displayed object in the selected subset. Moreover, the effect may be applied to each of these displayed objects in the selected subset according to the sequential order determined in operation 620.

Figure 7:
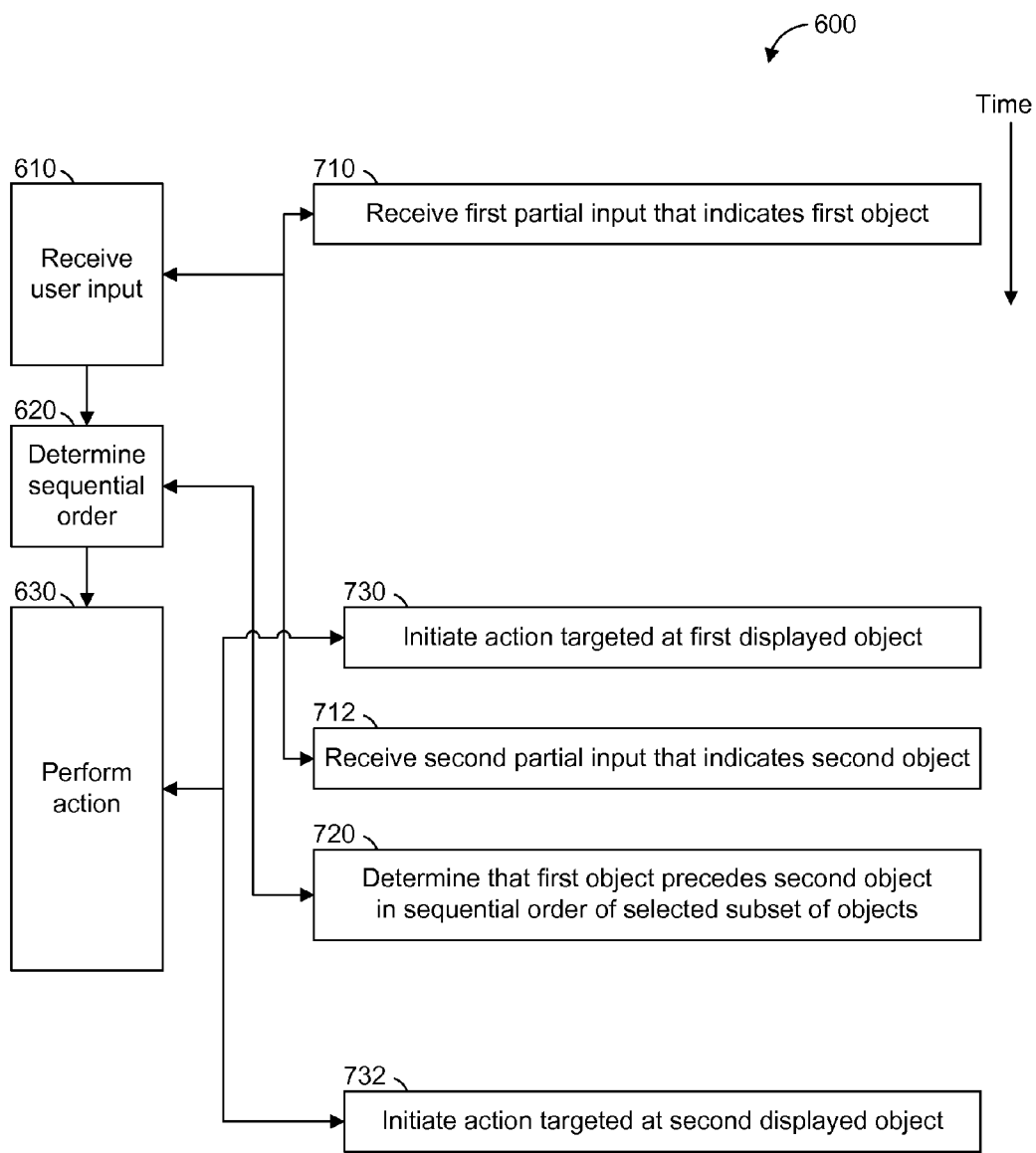

As shown in FIG. 7, one or more of the operations in the method 600 may be performed over a period of time. The direction of time is shown by an arrow in FIG. 7, and the method 600 may include one or more of operations 710, 712, 720, 730, and 732. FIG. 7 illustrates an example sequence of operations in which operations 710, 730, 712, 720, and 732 are performed, in that order.

Operations 710 and 712 may be performed as part (e.g., a precursor task, a subroutine, or a portion) of operation 610, in which the input module 510 receives the user input that defines the path. In operation 710, the input module 510 receives a first partial input that indicates a first object displayed on the screen 110 (e.g., enemy 131). In operation 712, the input module 510 receives a second partial input that indicates a second object displayed on the screen 110 (e.g., enemy 134). Operation 712 may be performed subsequent to operation 710.

Operations 730 and 732 may be performed as part of operation 630, in which the action module 530 performs the action (e.g., action 122) targeted at the selected subset of the displayed objects (e.g., according to the sequential order determined in operation 620). In operation 730, the action module 530 initiates the action targeted at (e.g., directed to) the first object (e.g., enemy 131), which is indicated by the first partial input received in operation 710. In operation 732, the action module 530 initiates the action (e.g., with or without modification) targeted at the second object (e.g., enemy 134), which is indicated by the second partial input received in operation 712. Operation 732 may be performed subsequent to operation 730, based on the sequential order determined in operation 620. In the example embodiment shown in FIG. 7, both the first object and the second object (e.g., enemies 131 and 134) are determined to be part of the selected subset of objects.

Operation 720 may be performed as part of operation 620, in which the selector module 520 determines the sequential order of the selected subset of the displayed objects (e.g., enemies 131, 132, 133, 134, and 135, in that order). In operation 720, the selector module 520 determines that the first object (e.g., enemy 131) precedes the second object (e.g., enemy 134) in the sequential order. This determination may be made based on the path. For example, this determination may be made based on the first partial input, which indicates the first object, being received in operation 710 prior to the second partial input, which indicates a second object, being received in operation 712. As noted above, this determined sequential order may form the basis for performing operation 732 subsequent to operation 730.

Figure 8:
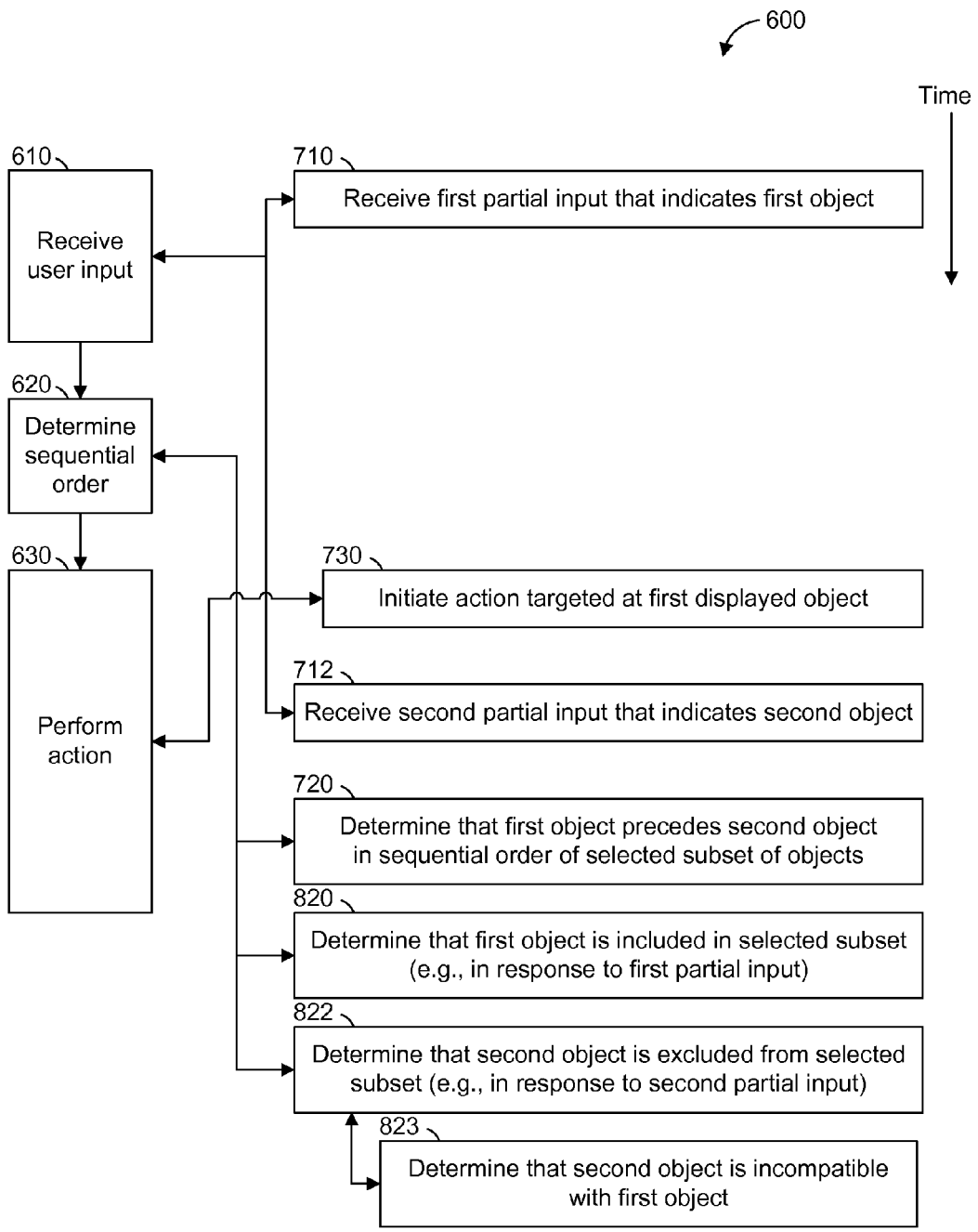

As shown in FIG. 8, a displayed object may be excluded from the selected subset. FIG. 8 illustrates the direction of time, similar to FIG. 7. In addition, FIG. 8 depicts an example embodiment in which the method 600 includes one or more of operations 710, 712, 720, 730, 820, and 822. Furthermore, FIG. 8 illustrates an example sequence of operations in which operations 710, 730, 712, 720, 820, and 822 are performed, in that order.

As noted above, operations 710 and 712 may be performed as part of operation 610. In operation 710, the input module 510 receives a first partial input that indicates a first object displayed on the screen 110 (e.g., enemy 131). After operation 710, the action module 530 may perform operation 730, in which the action targeted at the first object (e.g., enemy 131) is initiated. In operation 712, the input module 510 receives a second partial input that indicates a second object displayed on the screen 110 (e.g., enemy 136). Operation 712 is shown being performed subsequent to operation 710. As also noted above, operation 720 may be performed as part of operation 620. In operation 720, the selector module 520 determines that the first object (e.g., enemy 131) precedes the second object (e.g., enemy 134) in the sequential order being determined in operation 620.

In the example embodiment shown in FIG. 8, however, only the first object (e.g., enemy 131) and not the second object (e.g., enemy 136) is determined to be included in the selected subset of objects. One or more of operations 820 and 822 may be performed as part of operation 620, in which the selector module 520 determines the selected subset of objects and their sequential order.

In operation 820, the selector module 520 determines that the first object (e.g., enemy 131) is included in the selected subset. This determination may be made based on (e.g., in response to) the first partial input received in operation 710.

In operation 822, the selector module 520 determines that the second object (e.g., enemy 136) is excluded from the selected subset. This determination may be made based on (e.g., in response to) the second partial input received in operation 712.

Operation 823 may be performed as part of operation 822. In operation 823, the selector module 520 determines that the second object (e.g., enemy 136) is incompatible with the first object (e.g., enemy 131). Incompatibility between objects may be determined based on any number of various reasons, such as differences in characteristics of the objects (e.g., enemy type, size, speed, direction, or any suitable combination thereof). For example, in the context of a game, a prior addition of the enemy 131 (e.g., a wolf-like monster) into the selected subset may preclude the addition of the enemy 136 (e.g., a bat-like monster) into the same selected subset (e.g., enemy selected for this particular combination attack).

Figure 9:
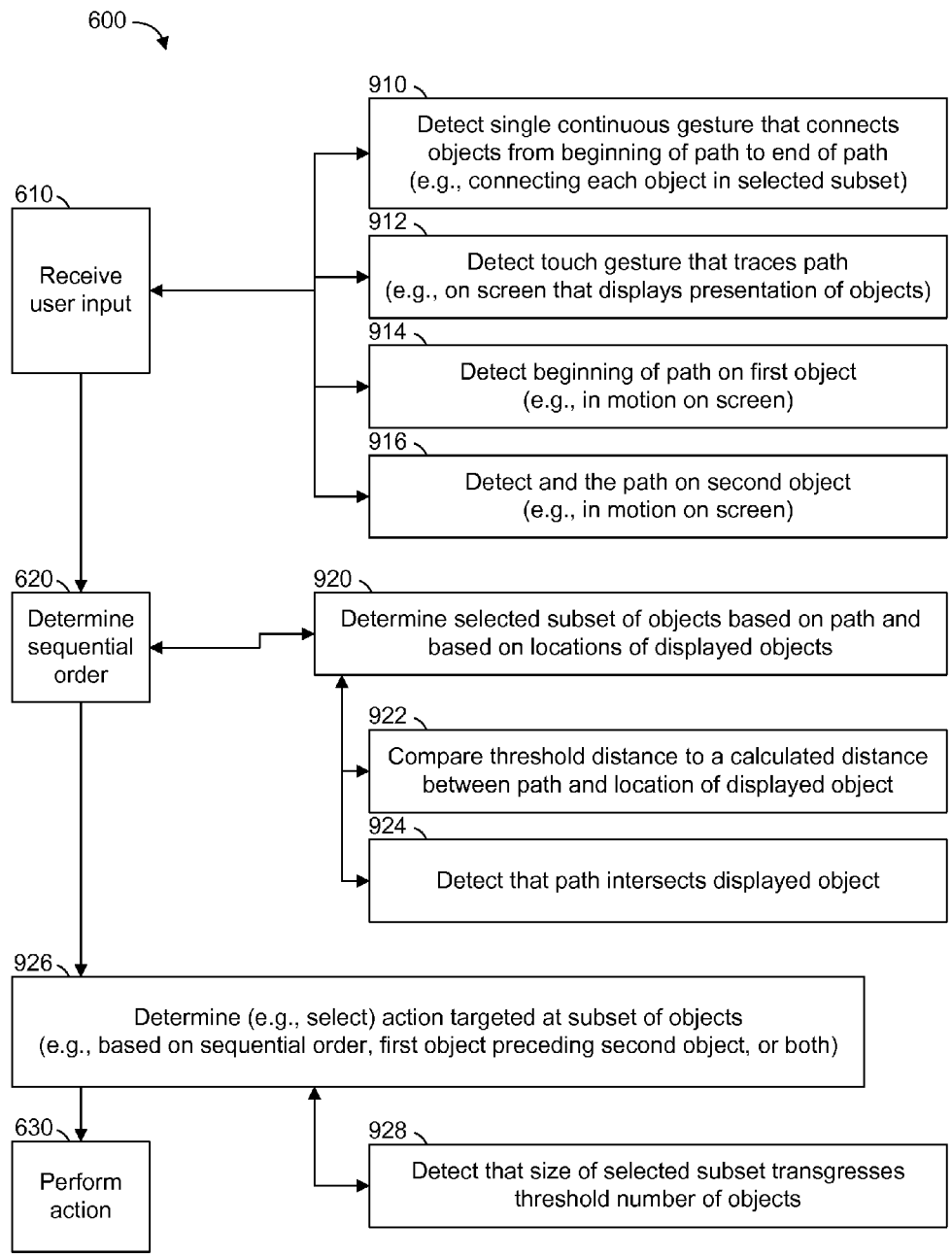

As shown in FIG. 9, the method 600 may include one or more of operations 910, 912, 914, 916, 920, and 926. One or more of operations 910, 912, 914, and 916 may be performed as part of operation 610, in which the input module 510 receives the user input that defines the path in the presentation of displayed objects (e.g., enemies 130-137).

In operation 910, the input module 510 detects a single continuous gesture that indicates (e.g., touches or connects) multiple objects displayed on the screen 110 (e.g., enemies 131, 132, 133, 134, and 135). These multiple objects connected by the single continuous gesture later may be determined to be the selected subset of displayed objects in operation 620.

In operation 912, the input module 510 detects a touch gesture that traces the path on the screen 110 (e.g., touch-sensitive screen) on which multiple objects are displayed (e.g., enemies 130-137). Detection of such a touch gesture may include receiving touchscreen input submitted by a user via fingertip, a stylus, or both.

In some example embodiments, one or more of the displayed objects (e.g., one or more of the enemies 130-137) are in motion within the presentation on the screen 110. In such situations, the path may indicate (e.g., by touching or intersecting) one or more moving objects displayed on the screen 110. Once determined to be selected (e.g., included in the selected subset of displayed objects), a selected object may remain selected regardless of its motion. In example embodiments that display the path according to which the subset of objects was selected, the path may be displayed as a moving line or curve that connects the selected objects and moves with them on the screen 110. In operation 914, the input module 510 detects the beginning of the path on a first displayed object (e.g., enemy 131) among the displayed objects. As noted above, one or more of the displayed objects (e.g., the first displayed object) may be in motion. In operation 916, the input module 510 detects the end of the path on a second displayed object (e.g., enemy 135), which may likewise be in motion on the screen 110.

Operation 920 may be performed as part of operation 620, in which the selector module 520 may determine the selected subset of displayed objects, the sequential order of the selected subset, or both. In operation 920, the selector module 520 determines the selected subset of objects (e.g., enemies 131-135) based on the path and based on one or more locations of the displayed objects. That is, those displayed objects that are on or near the path may be determined to be included in the selected subset, while those displayed objects that are neither on or near the path (e.g., sufficiently far away from the path) may be determined to be excluded from the selected subset. One or more of operations 922 and 924 may be performed as part of operation 920.

In operation 922, the selector module 520 compares a threshold distance to a calculated distance between the path and a location of a displayed object among the displayed objects. For example, the selector module 520 may compare a threshold distance to a calculated distance between the path (e.g., shown as broken line in FIG. 1-4) and a location of the enemy 134. As another example, the selector module 520 may compare a threshold distance to a calculated distance between the path and a location of the enemy 136. Based on such a comparison, the selector module 520 may perform operation 920.

In operation 924, the selector module 520 detects that the path intersects a displayed object (e.g., enemy 134). For example, the selector module 520 may detect that the path intersects the enemy 134, for example, by intersecting a boundary (e.g., an outer boundary) of an icon that represents the enemy 134. As another example, the selector module 520 may detect that the path intersects a point within an icon that represents the enemy 134 (e.g., a center point, a centroid point, a nucleus, or any suitable combination thereof). In such example embodiments, such a point may function as the location of the enemy 134 on the screen 110.

After determining a sequential order of the selected subset of displayed objects in operation 620, the selector module 520 may perform operation 926. In operation 926, the selector module 520 determines (e.g., selects) the action to be targeted at the selected subset of objects displayed on the screen 110 (e.g., action 122). Hence, the determined action may be targetable at the selected subset of objects. According to various example embodiments, operation 926 may be performed based on the sequential order determined in operation 620. For example, as noted above, the determination of the action may be based on whether the path ends on a "boss" enemy, in which case the selected action (e.g., action 122) may be a special attack (e.g., a powerful lightning attack). As another example, the determination of the action may be based on whether the path ends on a regular enemy, in which case the selected action (e.g., action 122) may be a different attack (e.g., a weaker fireball attack). As also noted above, different actions may be selected by the device 100 in situations where the user begins the path on a "boss" enemy, or where a "boss" enemy is between the beginning of the path and the end of the path (e.g., in the middle of the path). Hence, according to certain example embodiments, the selecting of the action in operation 926 may be based on a first displayed object (e.g., enemy 131) preceding a second displayed object (e.g., enemy 134) in the sequential order.

According to some example embodiments, operation 928 may be performed as part of operation 926. In operation 928, the selector module 520 detects that a size of the selected subset (e.g., as quantified by account of objects within the selected subset) transgresses a threshold number (e.g., threshold number of displayed objects). In such a case, the determination of the action in operation 926 may be based on the size of the selected subset. In particular, operation 926 may be based on the size of the selected subset transgressing (e.g., exceeding or falling below) the threshold number. Hence, the selected action (e.g., action 122) may be determined differently when the selected subset is a large group of displayed objects (e.g., enemies 131, 132, 133, 134, and 135), than when the selected subset is a small group of displayed objects (e.g., only enemies 131, 132, and 133). In the context of a game, for example, the selector module 520 may determine that an attack will be more powerful if the number of enemies connected by the path is at least three enemies or greater (e.g., thereby providing a bonus for larger attack combinations). Alternatively, the selector module 520 may determine more powerful attacks if the number of enemies indicated by the path is five enemies or less (e.g., thereby providing an incentive for smaller, more concentrated attacks).

According to various example embodiments, one or more of the methodologies described herein may facilitate selection of multiple objects displayed on a screen, and in particular, sequential selection of such multiple displayed objects. Moreover, one or more of the methodologies described herein may facilitate a quick, convenient, intuitive, and easily learned user interface for performing selections of objects. Hence, one or more the methodologies described herein may facilitate object selection in a real-time context (e.g., a fast-paced action game or other real-time software application). Sequential or non-sequential selection of multiple objects may therefore be performed via a gesture (e.g., a single continuous gesture), without entering a special selection mode (e.g., a mode in which the normally frenetic gameplay within a fast-paced action game is suspended while the user makes his selections).

When these effects are considered in aggregate, one or more of the methodologies described herein may obviate a need for certain efforts or resources that otherwise would be involved in selecting multiple objects to which an action is to be targeted. Efforts expended by a user in picking and choosing objects for inclusion in a group selection may be reduced by one or more of the methodologies described herein. Computing resources used by a device (e.g., device 100) may similarly be reduced. Examples of such computing resources include processor cycles, network traffic, memory usage, data storage capacity, power consumption, and cooling capacity.

Figure 10:
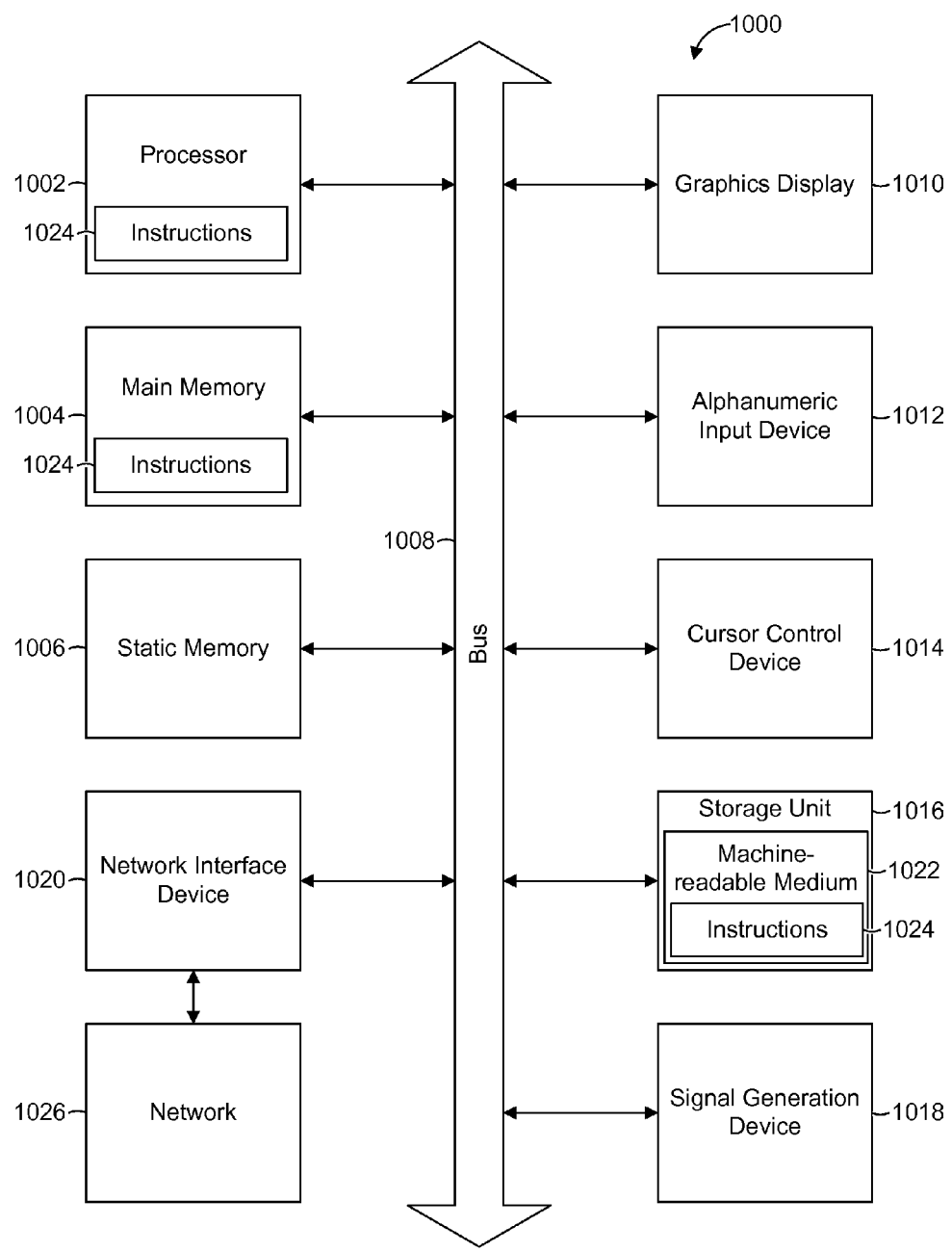
FIG. 10 is a block diagram illustrating components of a machine, according to some example embodiments, able to read instructions from a machine-readable medium and perform any one or more of the methodologies discussed herein.

FIG. 10 is a block diagram illustrating components of a machine 1000, according to some example embodiments, able to read instructions from a machine-readable medium (e.g., a machine-readable storage medium, a computer-readable storage medium, or any suitable combination thereof) and perform any one or more of the methodologies discussed herein, in whole or in part. Specifically, FIG. 10 shows a diagrammatic representation of the machine 1000 in the example form of a computer system and within which instructions 1024 (e.g., software, a program, an application, an applet, an app, or other executable code) for causing the machine 1000 to perform any one or more of the methodologies discussed herein may be executed, in whole or in part. In alternative embodiments, the machine 1000 operates as a standalone device or may be connected (e.g., networked) to other machines. In a networked deployment, the machine 1000 may operate in the capacity of a server machine or a client machine in a server-client network environment, or as a peer machine in a distributed (e.g., peer-to-peer) network environment. The machine 1000 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 1024, sequentially or otherwise, that specify actions to be taken by that machine. Further, while only a single machine is illustrated, the term "machine" shall also be taken to include a collection of machines that individually or jointly execute the instructions 1024 to perform all or part of any one or more of the methodologies discussed herein.

The machine 1000 includes a processor 1002 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1004, and a static memory 1006, which are configured to communicate with each other via a bus 1008. The machine 1000 may further include a graphics display 1010 (e.g., a plasma display panel (PDP), a light emitting diode (LED) display, a liquid crystal display (LCD), a projector, or a cathode ray tube (CRT)). The machine 1000 may also include an alphanumeric input device 1012 (e.g., a keyboard), a cursor control device 1014 (e.g., a mouse, a touchpad, a trackball, a joystick, a motion sensor, or other pointing instrument), a storage unit 1016, a signal generation device 1018 (e.g., a speaker), and a network interface device 1020.

The storage unit 1016 includes a machine-readable medium 1022 on which is stored the instructions 1024 embodying any one or more of the methodologies or functions described herein. The instructions 1024 may also reside, completely or at least partially, within the main memory 1004, within the processor 1002 (e.g., within the processor's cache memory), or both, during execution thereof by the machine 1000. Accordingly, the main memory 1004 and the processor 1002 may be considered as machine-readable media. The instructions 1024 may be transmitted or received over a network 1026 via the network interface device 1020.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1022 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions for execution by a machine (e.g., machine 1000), such that the instructions, when executed by one or more processors of the machine (e.g., processor 1002), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A method comprising:
    by an input module comprising one or more processors of one or more machines, receiving path input data that defines a path on a screen that displays icons available for selection;
    by a selector module comprising one or more processors of the one or more machines, determining a selected subset of the displayed icons based on the path input data and based on locations of the displayed icons on the screen, the selected subset having a sequential order defined by the path input data and the locations of the displayed icons on the screen;
    by the selector module comprising one or more processors of the one or more machines, determining an action to be targeted at the selected subset of the displayed icons; and
    by an action module comprising one or more processors of the one or more machines, causing the screen to display performance of the action targeted at each icon in the selected subset in the sequential order of the selected subset of the displayed icons.

2. The method of claim 1, wherein:
    the performance of the action is initiated during the receiving of the path input data that defines the path on the screen.

3. The method of claim 1, wherein:
    the selected subset of the displayed icons has a size that is quantified by a count of icons in the selected subset of the displayed icons; and
    the determining of the action to be targeted at the selected subset of the displayed icons is based on the count of icons in the selected subset.

4. The method of claim 3, wherein:
    the determining of the action to be targeted at the selected subset of the displayed icons is based on the count of icons in the selected subset transgressing a threshold number.

5. The method of claim 1, wherein:
    the path defined by the path input data has a beginning and an end;
    the end of the path on the screen specifies a last icon in the sequential order of the selected subset of the displayed icons; and
    the determining of the action is based on the specified last icon.

6. The method of claim 1, wherein:
    the path defined by the path input data has a beginning and an end;
    the beginning of the path on the screen specifies a first icon in the sequential order of the selected subset of the displayed icons; and
    the determining of the action is based on the specified first icon.

7. The method of claim 1, wherein:
    the receiving of the path input data includes:
        receiving a first partial input that selects a first icon for inclusion in the selected subset of the displayed icons; and
        receiving a second partial input that selects a second icon for inclusion in the selected subset of the displayed icons; and the method further comprises
    determining that the first icon precedes the second icon in the sequential order of the selected subset of the displayed icons.

8. The method of claim 1, wherein:
    the receiving of the path input data includes:
        receiving a first partial input that selects a first icon for inclusion in the selected subset of the displayed icons; and
        receiving a second partial input that selects a second icon for inclusion in the selected subset of the displayed icons; and
    the performance of the action includes initiating the action targeted at the first icon prior to the receiving of the second partial input.

9. The method of claim 1, wherein:
    the receiving of the path input data includes receiving a partial input that indicates an icon among the displayed icons on the screen is to be included in the selected subset of the displayed icons; and
    the determining of the selected subset of the displayed icons includes comparing a threshold distance to a calculated distance from the path on the screen to a location of the icon on the screen.

10. The method of claim 1, wherein:
    the receiving of the path input data includes receiving a partial input that indicates an icon among the displayed icons on the screen is to be included in the selected subset of the displayed icons; and
    the determining of the selected subset of the displayed icons includes detecting that the path on the screen intersects a location of the icon on the screen.

11. The method of claim 1, wherein:
    the receiving of the path input data includes:
        receiving a first partial input that indicates a first icon is to be included in the selected subset of the displayed icons; and receiving a second partial input that indicates a second icon is to be included in the selected subset of the displayed icons; and the determining of the selected subset of the displayed icons includes:

adding the first icon to the selected subset in response to the first partial input;

determining that the second icon is incompatible with the first icon; and excluding the second icon from the selected subset, despite the second partial input, in response to the determining that the second icon is incompatible with the first icon.

12. The method of claim 11, wherein:

the displayed icons on the screen represent enemies that are targetable by a player character within a videogame; and determining that the second icon is incompatible with the first icon based on the first and second icons being different from each other in a characteristic selected from a group consisting of size, speed, direction, and type.

13. The method of claim 1, wherein:

the screen is a touchscreen; and the receiving of the path input data includes detecting a touch gesture that traces the path on the touchscreen.

14. The method of claim 1, wherein:

the screen is a touchscreen; and the receiving of the path input data includes detecting a touch gesture that connects each icon in the selected subset of the displayed icons.

15. The method of claim 1, wherein:

the icons in the selected subset of the displayed icons on the screen represent enemies that are targetable by a player character within a videogame; and the performance of the action includes depicting attacks on the enemies targetable by the player character within the videogame in accordance with the sequential order of the selected subset of the displayed icons.

16. The method of claim 1, wherein:

the screen is included in a device of a user; and the receiving of the path input data includes receiving user input from the user via the device that includes the screen.

17. A non-transitory machine-readable storage medium comprising instructions that, when executed by processors of a machine, cause the machine to perform operations comprising:

by an input module comprising one or more processors of the machine, receiving path input data that defines a path on a screen that displays icons available for selection;

by a selector module comprising one or more processors of the machine, determining a selected subset of the displayed icons based on the path input data and based on locations of the displayed icons on the screen, the selected subset having a sequential order defined by the path input data and the locations of the displayed icons on the screen;

by the selector module comprising one or more processors of the machine, determining an action to be targeted at the selected subset of the displayed icons; and by an action module comprising one or more processors of the machine, causing the screen to display performance of the action targeted at each icon in the selected subset in the sequential order of the selected subset of the displayed icons.

18. The non-transitory machine-readable storage medium of claim 17, wherein:

the selected subset of the displayed icons has a size that is quantified by a count of icons in the selected subset of the displayed icons; and the determining of the action to be targeted at the selected subset of the displayed icons is based on the count of icons in the selected subset.

19. A system comprising:

one or more processors;

an input module comprising one or more of the processors and configured to receive path input data that defines a path on a screen that displays icons available for selection;

a selector module comprising one or more of the processors and configured to:

determine a selected subset of the displayed icons based on the path input data and based on locations of the displayed icons on the screen, the selected subset having a sequential order defined by the path input data and the locations of the displayed icons on the screen; and determine an action to be targeted at the selected subset of the displayed icons; and an action module comprising one or more of the processors and configured to cause the screen to display performance of the action targeted at each icon in the selected subset in the sequential order of the selected subset of the displayed icons.

20. The system of claim 19, wherein:

the path defined by the path input data has a beginning and an end;

the beginning of the path on the screen specifies a first icon in the sequential order of the selected subset of the displayed icons; and the determining of the action is based on the specified first icon.

* * * * *